(12) United States Patent
Youngers et al.

(10) Patent No.: US 7,436,555 B2
(45) Date of Patent: Oct. 14, 2008

(54) SYSTEMS AND METHODS FOR VERIFYING SCANNING MODE SELECTION

(75) Inventors: Kevin J. Youngers, Greeley, CO (US); Scott C. Baggs, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1257 days.

(21) Appl. No.: 10/637,390

(22) Filed: Aug. 8, 2003

(65) Prior Publication Data

US 2005/0030594 A1    Feb. 10, 2005

(51) Int. Cl.
*H04N 1/04* (2006.01)
*H04N 1/46* (2006.01)

(52) U.S. Cl. ............... 358/474; 358/504; 358/475

(58) Field of Classification Search ......... 358/474, 358/504, 475; 382/167, 122
See application file for complete search history.

(56) References Cited

U.S. PATENT DOCUMENTS

| | | | |
|---|---|---|---|
| 5,767,989 A * | 6/1998 | Sakaguchi | 358/474 |
| 6,259,540 B1 | 7/2001 | Hsu et al. | |
| 2001/0046070 A1 * | 11/2001 | Kito et al. | 358/505 |
| 2002/0051240 A1 | 5/2002 | Lu et al. | |
| 2002/0054383 A1 * | 5/2002 | Sato et al. | 358/504 |
| 2003/0053160 A1 * | 3/2003 | Cheng | 358/527 |
| 2003/0072038 A1 | 4/2003 | Cheng | |
| 2003/0089840 A1 | 5/2003 | Tseng et al. | |

FOREIGN PATENT DOCUMENTS

| | | |
|---|---|---|
| EP | 0267793 B1 | 5/1988 |
| JP | 2000/078600 | 3/2000 |

* cited by examiner

*Primary Examiner*—Houshang Safaipour

(57) ABSTRACT

In one embodiment, the present invention is directed to a method for verifying a scan mode selection utilized for a scanned image. The method comprises comparing the scanned image to scan samples stored in memory, determining a scan state from a scan sample that most closely corresponds to the scanned image, determining whether the scan mode selection is consistent with the determined scan state, and providing an indication that the scan mode selection is not consistent with the determined scan state.

17 Claims, 3 Drawing Sheets

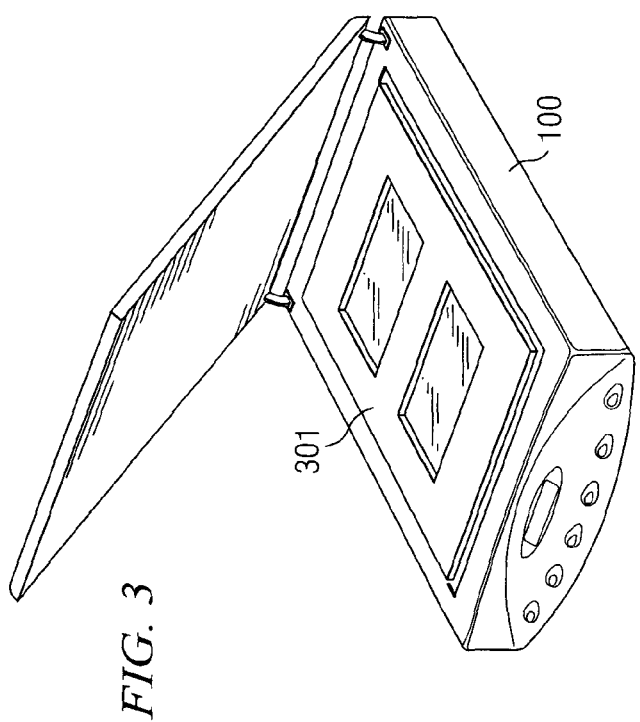
FIG. 2
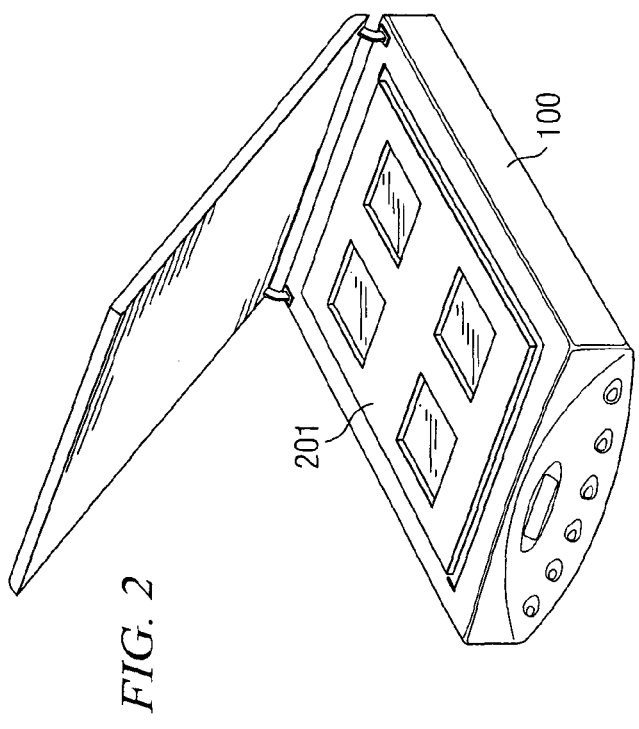
FIG. 3
| | LID DOWN/ NO TEMPLATE | POSITIVE ADAPTER | NEGATIVE ADAPTER | TRANSPARENT MEDIA ACCESSORY | TMA TEMPLATE | DOCUMENT FEEDER EMPLOYED | ⋮ |
|---|---|---|---|---|---|---|---|
| FLATBED | X | | | | | | ⋮ |
| POSITIVE | X | X | | | | | ⋮ |
| NEGATIVE | | X | X | X | X | X | ⋮ |
| ⋯ | | | | | | X | |
400
FIG. 4

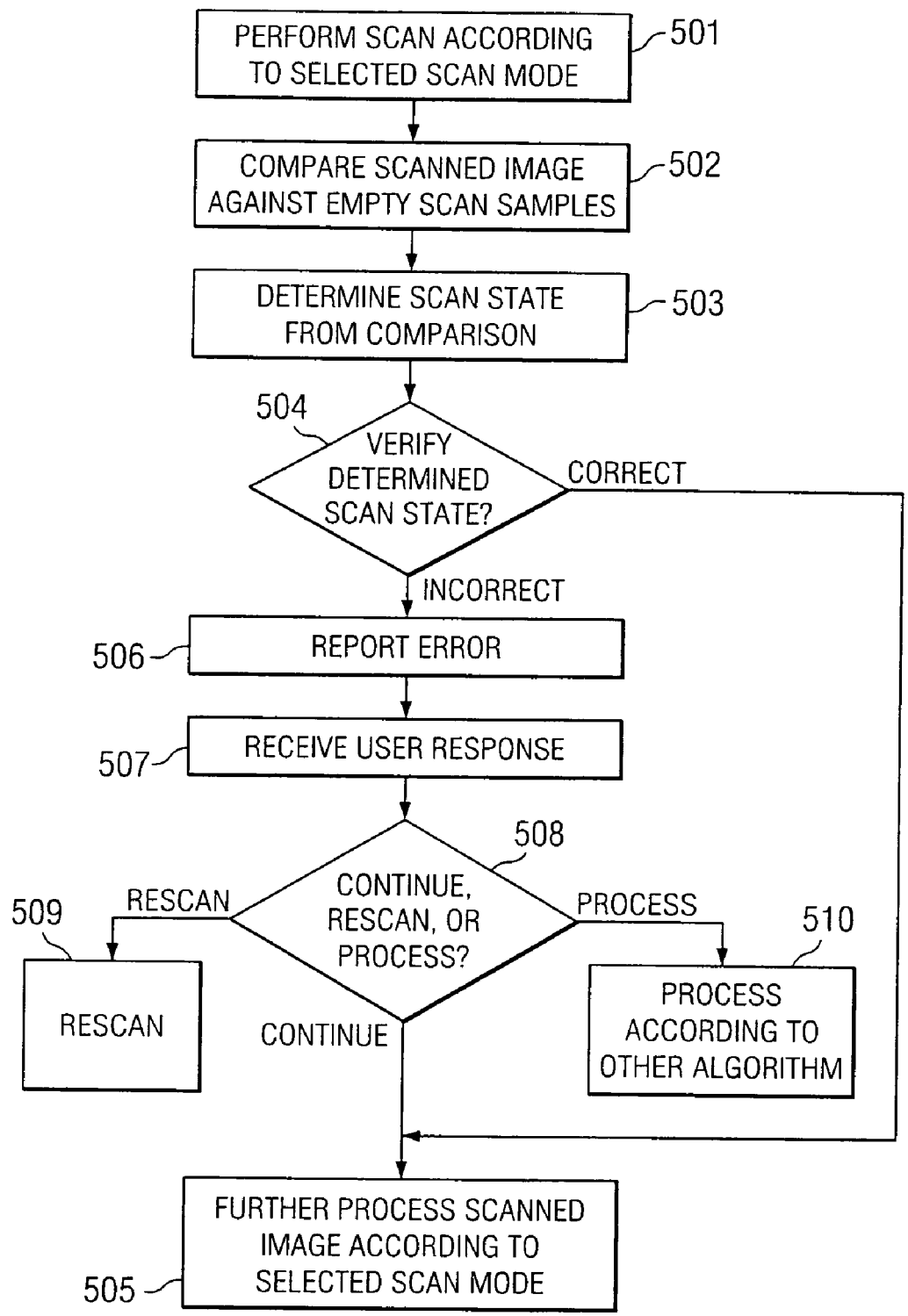

SYSTEMS AND METHODS FOR VERIFYING SCANNING MODE SELECTION

FIELD OF THE INVENTION

The present invention is related to verifying a scan mode selection associated with a scanned image.

BACKGROUND

At the present time, scanning peripherals provide a wide range of scanning functionality for consumers. A number of accessories are available that enable varying media, such as photographs, slides, and photographic negatives, to be scanned by a consumer. For example, if a user desires to scan transparent media (e.g., photographic negatives or slides), a transparent media accessory available from Hewlett-Packard Company may be utilized in conjunction with a suitable template. Specifically, the transparent media accessory is placed on the scan bed of a flatbed scanner and over the transparent media to be scanned. The transparent media accessory synchronously illuminates the transparent media from the back side of the transparent media during the sweeping of optics by the flatbed scanner. The template is also placed on the scan bed during the scanning operations. The purpose of the template is to block ambient light, because the transparent media accessory prevents the lid of the flatbed scanner from being closed.

To accommodate the ability to scan a variety of media, many scanners may be operated in a number of different modes. A "flatbed" scan mode may be defined for ordinary scan operations. A "positive" scan mode may be defined to scan certain types of media such as transparent slides in which increased resolution and/or dynamic range is appropriate. A "negative" scan mode may be defined for certain types of media in which the optical image is a negative image (i.e., photographic negatives). The selected mode may affect the scan operations (e.g., the resolution of the scan, the duration of the scan, and/or the like). Furthermore, the selected scan mode may affect the processing of the digital data after the scan, itself, is completed. For example, different quantization levels may be applied depending upon the selected mode. Additionally or alternatively, different cropping patterns may be applied depending upon the selected mode.

The scan mode is typically controlled by the user. For example, the user may select various options through a graphical user interface (GUI) of the operating system on the user's personal computer that, in turn, controls the scanner through a suitable driver.

SUMMARY OF THE INVENTION

In one embodiment, the present invention is directed to a method for verifying a scan mode selection utilized for a scanned image. The method comprises comparing the scanned image to scan samples stored in memory, determining a scan state from a scan sample that most closely corresponds to the scanned image, determining whether the scan mode selection is consistent with the determined scan state, and providing an indication that the scan mode selection is not consistent with the determined scan state.

DESCRIPTION OF THE DRAWINGS

FIG. 2 depicts a scanner with a slide adapter against a scan bed.

FIG. 3 depicts a scanner with a negative adapter against a scan bed.

FIG. 4 depicts a table for determining whether a scan mode was correctly selected.

FIG. 5 depicts a flowchart for processing a scanned image according to representative embodiments.

DETAILED DESCRIPTION

Representative embodiments are directed to systems and methods for verifying the appropriate selection of a scanning mode. Specifically, representative embodiments may operate a scanner in one of a plurality of modes. For example, a scanner may be operated in a flatbed mode, in a positive mode, in a negative mode, and/or the like. Certain scanning modes may involve the operations of a suitable accessory such as transparent media accessories. During the scanning operations, the digital data associated with the captured image is stored in memory. Selected portions of the digital data may be compared to "empty" scan samples discussed in greater detail below. Depending upon this comparison, a determination of whether the correct scan mode was selected is made. If an incorrect scan mode was selected, a suitable message (an error message, a dialog box, and/or the like) may be communicated to the user. The user may be given the opportunity to rescan if appropriate. Additionally or alternatively, the user may be given the opportunity to subject the digital data to a processing algorithm different from the originally selected mode.

Figure 1:
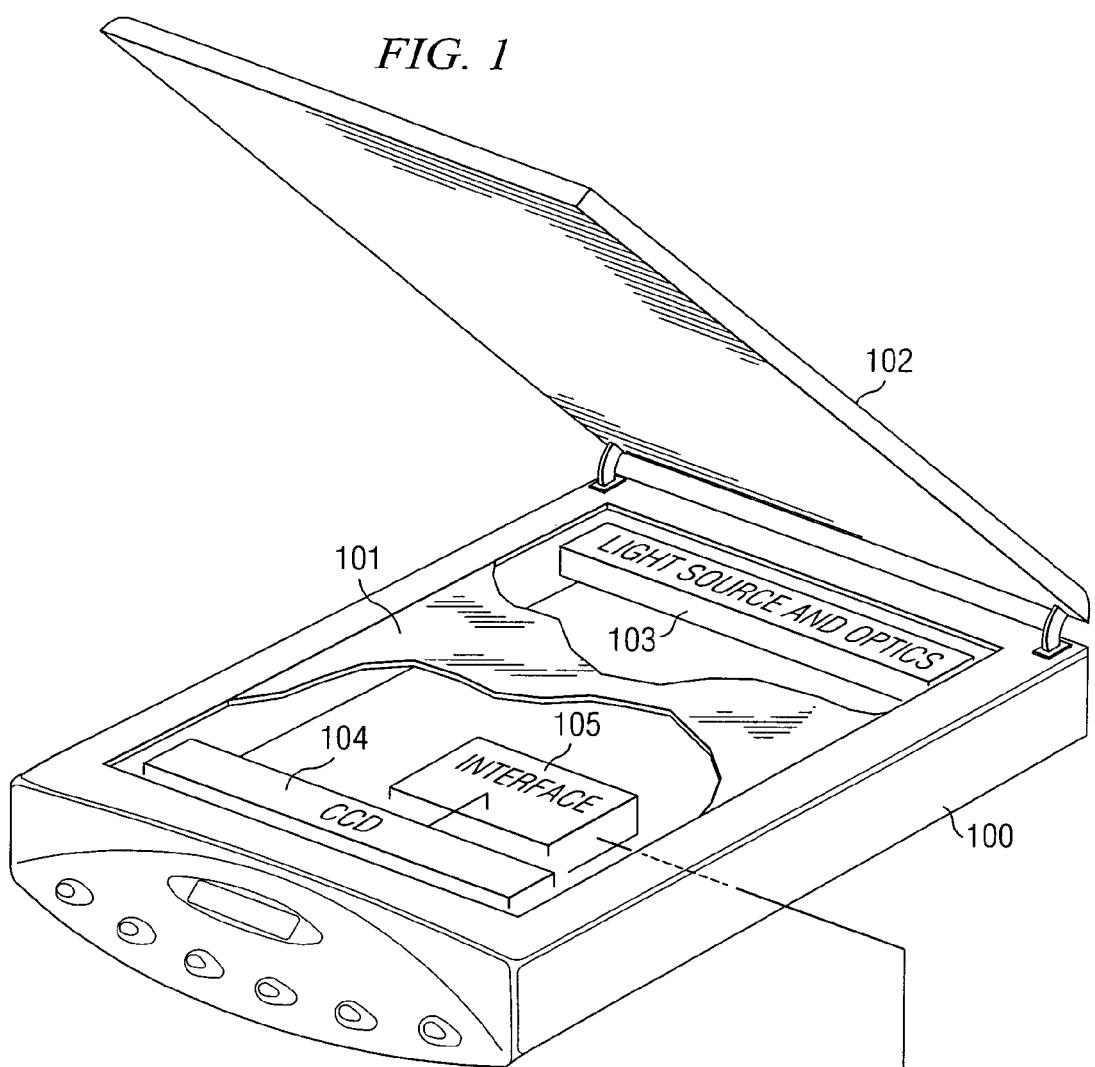
FIG. 1 depicts a scanner and a computer for processing scanned images according to representative embodiments.
Figure 1:
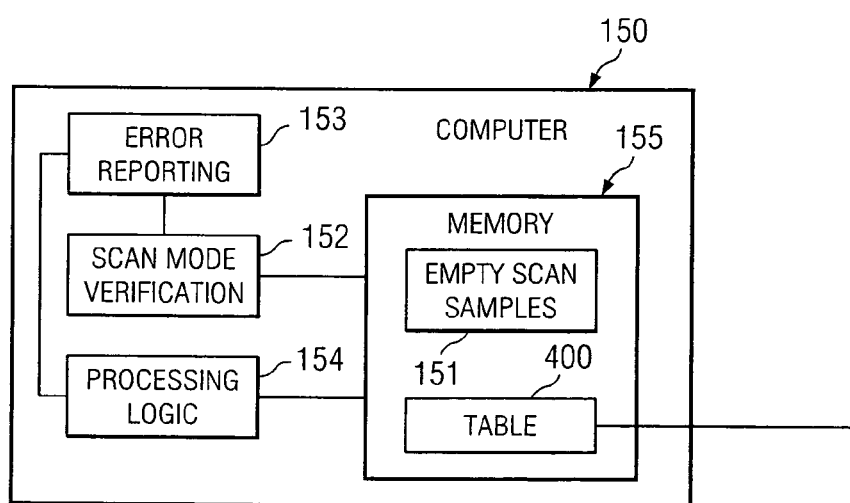

FIG. 1 depicts scanner 100 and computer 150 with executable code for processing scanned images according to representative embodiments. A medium to be scanned (e.g., a document, a photograph, a slide, a negative, and/or the like) may be placed against scan bed 101. Scanner 100 includes a moveable light source and redirection optics 103. Image light is redirected toward charge-coupled device (CCD) 104. Signals generated by sampling the elements of CCD 104 are digitized, communicated via interface 105, and stored in memory 155 of computer 150. Processing logic 154 may subject the digital data to suitable processing (e.g., dynamic range conversion, quantization, cropping, and/or the like). Processing logic 154 may be implemented utilizing suitable instructions executable by a processor.

The particular processing performed by processing logic 154 may depend upon a scanning mode selected by the user. For example, a different dynamic range may be utilized for photographs than utilized for photographic slides or photographic negatives. Likewise, relatively broad quantization levels may be applied during a flatbed scanning mode to eliminate noise in the image. The selected scan mode may also affect other scanning operations. For example, it may be advantageous to vary the scan resolution (e.g., dots per square inch) depending upon the selected scan mode. Increased resolution may be appropriate for positive or negative scans to increase image quality and relatively decreased resolution may be appropriate for flatbed scans to decrease scan time.

Memory 155 includes empty scan samples 151. Empty scan samples 151 are portions of the digital data generated during a scan for each of the available scanning modes. The samples may be generated utilizing "empty" scans, i.e., scans performed without including media on scan bed 101. Furthermore, empty scan samples 151 may be performed for each scan state. The scan states may include various lid positions, the inclusion or operation of an automatic feeder, the inclusion or operation of a transparent media accessory, the presence of a template, the presence of a media adapter, and/or the like. Media adapters hold multiple media (such as photographic slides or negatives) in fixed positions to enable each of the multiple media to be scanned and cropped during a single scan procedure. For example, empty scan samples 151 may be created by scanning a photographic slide adapter 201 as shown in FIG. 2 without including slides within the corresponding portions of the template. Likewise, empty scan samples 151 may be created by scanning negative slide adapter 301 as shown in FIG. 3 without including negatives within the corresponding portions of the template. Alternatively, empty scan samples 151 may be created by scanning blank media or other suitable media with various adapters, templates, and/or accessories. By performing empty sample scans, patterns may be generated for each scan mode type and for selected scan states for comparison against scanned images generated according to scanning modes selected by the user. Other suitable patterns may be stored in memory 155 to facilitate scan mode verification according to other embodiments. For example, other calibrated patterns may be utilized to perform scan mode verification if desired for a particular application.

When a user-initiated scan procedure occurs, the scanned image may be compared against the empty scan samples 151 by scan mode verification logic 152 to determine the scan state. The determined scanned state may be compared against a suitable data structure (e.g., table 400 that will be discussed in greater detail below) to determine whether the selected scan mode was correct. When it is probable that an erroneous or inappropriate scan mode selection was made, error reporting logic 153 may report an error or another suitable message to the user. The user may be given the opportunity to rescan or subject the captured digital data to processing that is different than the processing associated with the originally selected scan mode.

The comparison of a scanned image to scan samples is not restricted to processing within computer 150. In alternative embodiments, processing logic 154, memory 155 with scan samples 151, scan mode verification logic 152, and/or error reporting logic 153 may be implemented within scanner 100 if desired.

Table 400 of FIG. 4 depicts a selection mode table that may be utilized to verify the scan mode selection made by a user according to representative embodiments. Table 400 includes a plurality of rows with each row corresponding to a particular scan mode (e.g., flatbed mode, positive mode, and negative mode). Table 400 includes a plurality of columns with each column corresponding to a particular scan state. The scan states may include: (i) lid down/no template; (ii) positive adapter present; (iii) negative adapter present; (iv) transparent media accessory present; (v) TMA template present; (vi) document feeder employed; and/or the like. The entries of table 400 may include information that indicates whether a given scan state is appropriate or inappropriate for a selected scan mode. For example, for the "lid down/no template" state, table 400 indicates that the positive scan mode and the negative scan mode are inappropriate.

FIG. 5 depicts a flowchart for processing a scanned image according to representative embodiments. The flowchart may be performed in association with scan mode verification logic 152 and error reporting logic 153 and may be implemented utilizing suitable application specific circuitry, executable instructions performed by a processor, or a combination thereof.

In step 501 of the flowchart of FIG. 5, a scan is performed according to a selected scan mode. In step 502, the scanned image is compared against scan samples. One exemplary algorithm for comparing includes performing a pixel-for-pixel comparison between the scanned image data and the scan sample data. For each pixel in the scanned image raster, the following error value is calculated: Error=scanned_image_pixel_value−empty_scan_pixel_value. The final error value for each scan sample is the sum of the calculated errors. The scan sample, that produced the smallest final error value and that is less than a predetermined threshold, is selected to indicate the scan state.

In step 503, from the comparison, the scan state is determined from the most closely correlated scan sample for the selected scan mode. In step 504, a logical comparison is made to verify the correctness of the determined scan state (by, for example, utilizing table 400). If the selected scan state is proper, the process flow proceeds to step 505 where the scan data is further processed according to the image processing algorithm associated with the selected scan mode. For example, suitable image files may be created for cropped portions of the scanned image corresponding to discrete slides, negatives, or photographs. If the selected scan state is incorrect, the process flow proceeds to step 506. In step 506, an error or other suitable message is reported. A dialog box may be presented to the user via computer 150 to indicate that an incorrect selection has been made. Alternatively, a flashing light emitting diode (LED) or an audible indication may be used to indicate that an incorrect selection has been made. In step 507, a response from the user to the reported error may be received. In step 508, a logical comparison is made to determine whether the user wishes to continue according to the selected scan mode, rescan the medium, or process the scanned image according to a different processing algorithm than originally selected. From step 508, the process flow proceeds either to step 505 to continue with the selected scan mode, to step 509 to rescan, or to step 510 to process according to a different processing algorithm.

Representative embodiments enable users to make use of automatic scanning functionality. If a more appropriate scanning mode is available, representative embodiments may automatically inform the user and enable the user to select the more appropriate scanning mode without requiring the user to manually perform complex peripheral state setting steps through the user's operating system.

What is claimed is:

1. A method for verifying a scan mode selection utilized for a scanned image, comprising:

comparing said scanned image to scan samples stored in memory;

determining a scan state from a scan sample that most closely corresponds to said scanned image;

determining whether said scan mode selection is consistent with said determined scan state; and providing an indication that said scan mode selection is not consistent with said determined scan state; wherein said scan samples comprise images from scans of media adapters utilized to hold media in fixed positions during scan operations.

2. The method of claim 1 wherein said media adapters are configured to hold a plurality of photographic slides or are configured to hold a plurality of photographic negatives.

3. The method of claim 1 wherein scan states comprise lid position, operation of an adapter accessory, presence of a media adapter utilized to hold media in fixed positions during scanning, and presence of a template that blocks ambient light during scan operations.

4. The method of claim 1 wherein said scanned image is an image of one item selected from the group consisting of: a document, a photograph, a photographic slide, and a photographic negative.

5. The method of claim 1 wherein said determining whether said scan mode selection is consistent comprises:
retrieving verification information from a table that defines scan states for a plurality of scan modes.

6. The method of claim 1 further comprising:
receiving data input from a user in response to said indication; and
performing, in response to said data, a step selected from the group consisting of:
(i) rescanning according to a different scan mode selection; and
(ii) processing said scanned image according to an algorithm that differs from a processing algorithm associated with said selected scan mode.

7. A system for verifying a selected scan mode of a scanned image, said system comprising:
memory that stores scan samples, wherein each of said scan samples defines a pattern associated with a respective scan state;
verification logic that determines whether said selected scan mode is consistent with a scan state associated with said scanned image, wherein said verification logic determines said scan state by identifying a scan sample of said scan samples that most closely matches said scanned image; and
reporting logic for reporting that said selected scan mode is inconsistent with said scan state associated with said scanned image.

8. The system of claim 7 wherein said reporting logic provides a visual indication that said selected scan mode is inconsistent.

9. The system of claim 7 wherein said reporting logic provides an audible indication that said selected scan mode is inconsistent.

10. The system of claim 7 wherein said scan samples comprises image data that is representative of a pattern associated with scans of media adapters utilized to hold media in fixed positions during said scanning operations.

11. The system of claim 7 wherein said scan states comprise lid position, operation of an adapter accessory, presence of a media adapter utilized to hold media in fixed positions during scanning, and presence of a template that blocks ambient light during scanning operations.

12. The system of claim 7 wherein said verification logic is implemented as software instructions.

13. A system for processing scanned images, said system comprising:
means for scanning a medium to generate a scanned image according to a selected scan mode;
means for storing scan samples that are representative of a pattern associated with scans of media adapters utilized to hold media in fixed positions during scan operations;
means for determining a scan state from a scan sample that most closely corresponds to said scanned image;
means for determining whether said selected scan mode is consistent with said determined scan state; and
means for reporting that said selected scan mode is not consistent with said determined scan state; wherein
said media adapters are configured to hold a plurality of photographic slides or are configured to hold a plurality of photographic negatives.

14. The system of claim 13 wherein scan states comprise lid position, operation of an adapter accessory, presence of a media adapter utilized to hold media in fixed positions during scanning, and presence of a template that blocks ambient light during scanning operations.

15. The system of claim 13 wherein said medium is selected from the group consisting of: a document, a photograph, a photographic slide, and a photographic negative.

16. The system of claim 13 wherein said means for determining retrieves verification information from a table that defines scan states for a plurality of scan modes.

17. The system of claim 13 wherein said means for reporting provides a visual indication that said selected scan mode is not consistent with said determined scan state.

\* \* \* \* \*